(No Model.)
F. L. WALTNER.
LOOSE PULLEY.
No. 249,426. Patented Nov. 8, 1881.
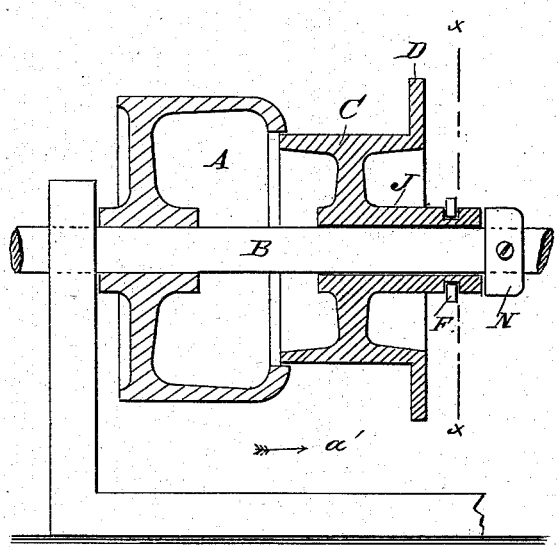
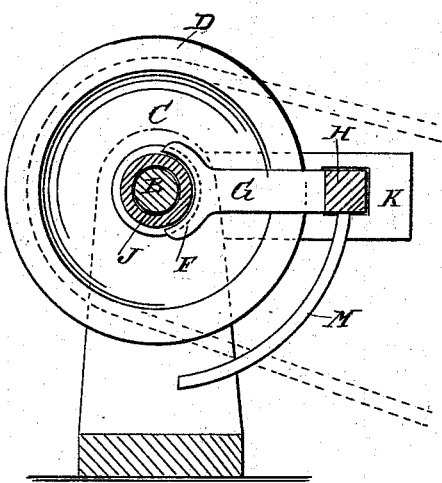
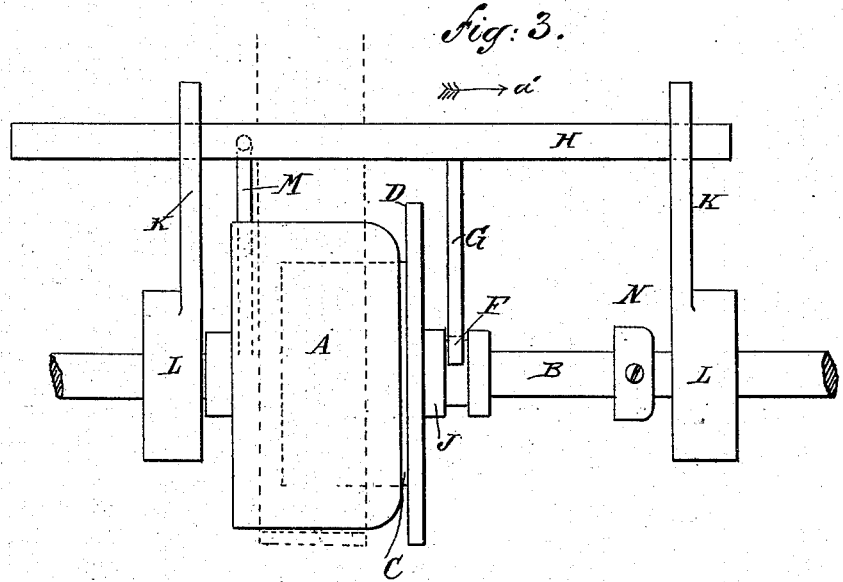
WITNESSES:
INVENTOR:
F. L. Waltner
BY Munn & Co
ATTORNEYS.

UNITED STATES PATENT OFFICE.

FRANKLIN L. WALTNER, OF HAMILTON, OHIO.

LOOSE PULLEY.

SPECIFICATION forming part of Letters Patent No. 249,426, dated November 8, 1881.

Application filed September 1, 1881. (No model.)

*To all whom it may concern:*

Be it known that I, FRANKLIN L. WALTNER, of Hamilton, in the county of Butler and State of Ohio, have invented a new and Improved Loose Pulley, of which the following is a full, clear, and exact description.

The object of my invention is to facilitate shifting a belt from a tight to a loose pulley, and vice versa, and at the same time to prevent waste of power and the rapid destruction of the loose pulley.

The invention consists in a fixed pulley, within which slides a loose pulley, which is adapted by its movement to carry the belt from the loose pulley on the fixed pulley.

The invention further consists in the combination, with these pulleys, of a sliding bar provided with an arm catching on the loose pulley and a curved arm for shifting the belt from the driving-pulley.

Reference is to be had to the accompanying drawings, forming part of this specification, in which similar letters of reference indicate corresponding parts in all the figures.

Figure 1 is a longitudinal sectional elevation of my improved loose and driving pulley. Fig. 2 is a cross-sectional elevation of the same on the line $x \, x$, Fig. 1. Fig. 3 is a longitudinal elevation of the same.

A hollow or cylindrical box-shaped pulley, A, having one end open, is rigidly mounted on the shaft B, the edge of the curved surface of the pulley being slightly rounded or beveled toward the shaft at the open end. A pulley, C, fitting into the open end of the pulley A, is loosely mounted to slide on the shaft B, and is provided with a flange, D, at its outer end. The forked end F of an arm, G, attached to a bar, H, catches in the sleeve or hub J of the pulley C. This bar H slides parallel to the shaft B in arms K of the hangers L of the shaft B. A curved arm, M, is attached to the bar H a distance from the arm G slightly greater than the width of the pulley A. A collar, N, is screwed on the shaft B to check the movements of the sliding pulley-wheel C.

When the belt is on the rigid or driving-pulley A the loose pulley must be contained within the rigid pulley, as shown in Fig. 3, the flange D and the arm M preventing the belt from slipping off. If the belt is to be passed on the loose pulley C the sliding bar H is moved in the direction of the arrow $a'$, whereby the loose pulley C will be drawn out of the rigid pulley A and the arm M strikes the belt, causing it to run from the rigid pulley A on the loose pulley C, the flange D preventing the belt from running off this pulley, on which it runs or hangs slackened, as the pulley C is smaller than the pulley A and cannot give the belt the same tension as the pulley A can. If the belt is to be shifted back on the pulley A the bar H is moved in the inverse direction of the arrow $a'$, causing the flange D to push the belt in the same direction, the belt passing up the beveled end of the pulley A upon this pulley.

When the belt is on the loose pulley C it is slackened and has not sufficient tension to rotate this pulley, and consequently the same will not wear out as rapidly as a rotating loose pulley, and the belt is not worn off as rapidly by shifting it in the manner described as it is by the ordinary method with a loose rotating pulley.

Having thus fully described my invention, what I claim as new, and desire to secure by Letters Patent, is—

1. A belt-pulley constructed substantially as herein shown and described, and consisting of a fixed pulley, within which slides a loose pulley, which is adapted by its movement to carry the belt from the loose pulley to the fixed pulley, as set forth.

2. The combination, with the shaft B, of the fixed pulley A and of the sliding pulley C, fitting in the pulley A, substantially as herein shown and described, and for the purpose set forth.

3. The combination, with the shaft B, of the fixed pulley A, having its open end beveled or rounded, and of the sliding pulley C, fitting in the pulley A, and provided with an end flange, D, substantially as herein shown and described, and for the purpose set forth.

4. The combination, with the shaft B, of the fixed pulley A, the sliding pulley C, the sliding bar H, and the arm G, catching on the hub of the pulley C, substantially as herein shown and described, and for the purpose set forth.

5. The combination, with the shaft B, of the fixed pulley A, the sliding pulley C, the sliding bar H, the arm G, catching on the hub of the pulley C, and of the curved arm M, substantially as herein shown and described, and for the purpose set forth.

6. The combination, with the shaft B, of the fixed pulley A, the sliding pulley C, the sliding bar H, the arms G and M, and the check-collar N, substantially as herein shown and described, and for the purpose set forth.

7. The combination, with the shaft B, of the fixed pulley A, the sliding pulley C, the sliding bar H, the arms G and M, and the arms K of the hangers L, substantially as herein shown and described, and for the purpose set forth.

FRANKLIN LUTHER WALTNER.

Witnesses:
 THOS. REGAN,
 S. J. OPPENHEIMER.